United States Patent [19]

Miller et al.

[11] Patent Number: 5,242,621
[45] Date of Patent: Sep. 7, 1993

[54] COMBINATIONS OF ALKANOIC HYDROCARBYL DICARBOXYLIC AND CARBOCYCLIC ALKANOIC ACIDS OR SALTS USEFUL AS HEAT TRANSFER FLUID CORROSION INHIBITORS

[75] Inventors: David L. Miller; Brian L. Benac; John F. Knifton, all of Austin, Tex.

[73] Assignee: Texaco Chemical Co., White Plains, N.Y.

[21] Appl. No.: 892,875

[22] Filed: Jun. 3, 1992

[51] Int. Cl.$^5$ .............................................. C23F 11/12
[52] U.S. Cl. .................................... 252/396; 252/68; 252/76; 252/79; 252/389.61; 252/389.62; 422/17
[58] Field of Search ...................... 252/396, 79, 68, 76, 252/389.61, 389.62; 422/17

[56] References Cited

U.S. PATENT DOCUMENTS

| | | | |
|---|---|---|---|
| 3,931,029 | 1/1976 | Dutton et al. | 252/396 |
| 3,981,682 | 9/1976 | Ward et al. | 252/396 |
| 4,105,405 | 8/1978 | Wehle et al. | 21/2.7 |
| 4,382,008 | 5/1983 | Boreland et al. | 252/396 |
| 4,587,028 | 5/1986 | Darden | 252/76 |
| 4,592,853 | 6/1986 | Darden et al. | 252/396 |
| 4,647,392 | 3/1987 | Darden et al. | 252/75 |
| 4,657,689 | 4/1987 | Darden | 252/75 |
| 4,759,864 | 7/1988 | Van Neste et al. | 252/396 |
| 4,851,145 | 7/1989 | Van Neste et al. | 252/396 |
| 4,869,841 | 9/1989 | Matteodo et al. | 252/396 |
| 5,085,791 | 2/1992 | Burns | 252/79 |

*Primary Examiner*—Robert L. Stoll
*Assistant Examiner*—Valerie Fee
*Attorney, Agent, or Firm*—James J. O'Loughlin; Henry H. Gibson

[57] ABSTRACT

Corrosion inhibitors containing alkanoic, hydrocarbyl dicarboxylic and carbocyclic-substituted, alkanoic acids or salts give high performance, heat transfer fluids and antifreezes, with improved properties including storage stability.

33 Claims, No Drawings

COMBINATIONS OF ALKANOIC HYDROCARBYL DICARBOXYLIC AND CARBOCYCLIC ALKANOIC ACIDS OR SALTS USEFUL AS HEAT TRANSFER FLUID CORROSION INHIBITORS

BACKGROUND OF THE INVENTION

1. Field of the Invention

This invention concerns corrosion inhibitors, and more particularly to specific carboxylic acid/salt combinations which inhibit corrosion in heat transfer fluids, such as antifreezes.

2. Description of Related Invention

Metallic materials used in heat-transfer systems, such as internal combustion engines, undergo corrosive attack from heat transfer fluids, such as aqueous media containing antifreeze. The resulting metal damage, such as pitting and metal loss, causes perforations or other defects leading to fluid loss and system failure.

Various corrosion inhibitors have been added to heat transfer fluids to reduce corrosion of metallic systems. For example, U.S. Pat. No. 4,587,028 (Darden) discloses non-silicate antifreeze formulations containing alkali metal salts of benzoic acid, dicarboxylic acid and nitrate. Additional ingredients including alkali metal hydroxides, alkali metal nitrates and aromatic triazoles, such as tolyltriazole or benzotriazole are preferably provided. U.S. Pat. No. 4,647,392 (Darden et al.) discloses corrosion inhibitors using aliphatic monobasic acids or salts, hydrocarbyl dibasic acids or salts and hydrocarbonyl triazole. U.S. Pat. No. 4,657,689 (Darden) discloses corrosion inhibitors containing aliphatic monobasic acids or salts, hydrocarbyl dibasic acids or salts, hydrocarbyl azoles and specific hydrocarbyl alkali metal sulfonates. U.S. Pat. No. 5,085,791 (Burns) discloses antifreeze compositions containing cyclohexane acid corrosion inhibitor alone or in combination with other corrosion inhibitors, particularly sebacic acid and tolyltriazole. The cyclohexane acid includes cyclohexyl carboxylic (formic) acid, cyclohexyl acetic acid and cyclohexyl propionic acid. The cyclohexane acid is targeted to inhibit lead solder and/or aluminum corrosion. U.S. Pat. No. 4,105,405 (Wehle et al.) discloses the use of cyclohexane hexacarboxylic acid corrosion inhibitors.

These and other combinations of corrosion inhibitors generally use azoles and/or other compounds either as essential or preferred components. Azoles are generally used to inhibit copper and brass corrosion and to assist in the protection of iron and steel. Other typical corrosion inhibitors include silicates, phosphates, nitrates and other commonly used materials. Many corrosion inhibitors, however, have limited utility. For example, silicates can cause gelling leading to system damage or seal wear, requiring the addition of stabilizers. Azoles, like tolyltriazole, deplete from the system relatively rapidly requiring the expense of replacement and disposal problems. The presence of amines can lead to formation of nitrosamines which are carcinogens creating disposal problems. These and other difficulties of many corrosion inhibitors limit the utility of current, commercial corrosion inhibitors.

Corrosion inhibitors are needed which are effective in inhibiting corrosion in a wide variety of metals and which have long term stability without the addition of stabilizers and without other harmful or limiting properties.

SUMMARY OF THE INVENTION

This invention concerns corrosion inhibitor compositions comprising a combination of alkanoic acid or salt, hydrocarbyl dicarboxylic acid or salt and carbocyclic-substituted, alkanoic acid or salt. The carbocylic-substituted, alkanoic acid or salt has a structure:

$$H_{9+m}C_6-R-COOM$$

wherein: M is hydrogen or a cation; m is 0 or 2 such that $H_{9+m}C_6$ is cyclohexenyl or cyclohexyl, respectively; and R is alkylene having a formula $C_nH_{2n}$ with n carbon atoms; provided n is at least 3 when m is 2. Heat transfer compositions comprising heat transfer fluid and a corrosion inhibiting amount of the corrosion inhibitor are provided. Antifreeze compositions comprising freezing point depressant and a corrosion inhibiting amount of the corrosion inhibitor are also provided. Processes for inhibiting corrosion of metal in contact with heat transfer fluid are also provided. The process comprises including in the fluid a corrosion inhibiting amount of the corrosion inhibitor.

DETAILED DESCRIPTION OF THE INVENTION

Corrosion inhibitor compositions have been discovered which protect a variety of metals normally used in contact with heat transfer fluid and which have long term stability without the need for stabilizers or other materials having harmful or undesirable properties.

The corrosion inhibitor composition comprises, and preferably consists essentially of, three kinds of components: (1) alkanoic acid or salt; (2) hydrocarbyl dicarboxylic acid or salt; and (3) carbocyclic-substituted, alkanoic acid or salt. The term "hydrocarbyl" means a monovalent group containing hydrogen and carbon atoms, unless otherwise stated. The hydrocarbyl may have any configuration such as acyclic, including straight or branched chain, or carbocyclic, and may be saturated or unsaturated, including aromatic, and may be unsubstituted or substituted with other moieties containing oxygen, nitrogen, halogen or other atoms. Any suitable salt of the three kinds of acids can be used including, among others, one or mixtures of the following: any alkali metal, such as sodium and potassium; ammonium or other amine; or any other useful cationic group.

The alkanoic and hydrocarbyl dicarboxylic acids or salts typically each have from about 5 to about 16, and preferably from about 8 to about 12, carbon atoms. Typical alkanoic acids include, among others, one or mixtures of the following: octanoic; 2-ethylhexanoic; nonanoic; neodecanoic; decanoic; and the like. Preferred alkanoic acids include 2-ethylhexanoic and octanoic acids. Typical hydrocarbyl dicarboxylic acids include, among others, one or mixtures of the following: suberic; azelaic; sebacic; undecanedioic; dodecanedioic; dicyclopentadiene diacid; terephthalic; and the like. Preferred hydrocarbyl dicarboxylic compounds include sebacic acid.

Carbocyclic-substituted, alkanoic acids are generally compounds having a structure as shown in Formula 1:

$$H_{9+m}C_6-R-COOM \qquad \text{Formula 1.}$$

In Formula 1, the degree of saturation of the carbocyclic group, $H_{9+m}C_6$, is given by the variable m which may be 0 or 2. When m is 0, the carbocyclic group is a monounsaturated, cyclohexenyl group. When m is 2, the carbocyclic group is a saturated cyclohexyl group. The carbocyclic group is connected to an alkylene group, $C_nH_{2n}$, having n carbon atoms. The alkylene group may have any configuration, including a straight- or branched-chain of carbon atoms. The number of carbon atoms in the alkylene group is not narrowly critical provided at least 3 carbon atoms are present when m is 2, for cyclohexyl substitution. Acids are given when M is hydrogen. Salts are given when M is a cation. Typical cyclohexenyl and cyclohexyl alkanoic acids include, among others, one or mixtures of compounds shown in Formulas 2 and 3, respectively.

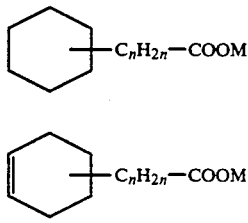

Formula 2

Formula 3

In Formula 2, the number of carbon atoms in the alkylene chain, given by n, is at least 3, preferably from 3 to about 10, and most preferably about 4. In Formula 3, the number of carbon atoms in the alkylene group may be 0 or more, preferably from 0 to about 10, and most preferably about 3 or 4. The carboxylic group in either Formulas 2 or 3 may be an acid, where M is hydrogen, or salt, where M is any suitable salt as previously described. M is preferably hydrogen. Typical carbocyclic-substituted, alkanoic acids include, among others, one or mixtures of the following: cyclohexylalkanoic compounds including 4-cyclohexylbutyric, 4-cyclohexylisobutyric, and the like; cyclohexenylalkanoic compounds including 3-cyclohexenylpropionoic, 2-cyclohexenylpropionic, 4-cyclohexenylbutyric, 4-cyclohexenylisobutyric, and the like; and like compounds. Preferred carbocyclic-substituted, alkanoic compounds include 4-cyclohexylbutyric acid and 2- and 3-cyclohexenylpropionoic acid.

The antifreeze composition comprises freezing point depressant and a corrosion inhibiting amount of the corrosion inhibitor combination. Any effective, including known, freezing point depressant can be used. Typical freezing point depressants include, among others, one or mixtures of the following: glycols, such as ethylene glycol, diethylene glycol, propylene glycol, dipropylene glycol, and the like; glycol ethers, such as methyl, ethyl, propyl and butyl ethers or ethylene glycol, diethylene glycol, propylene glycol, diproplylene glycol, and the like; and other freezing point depressants. Ethylene glycol is preferred as the major antifreeze component.

Heat transfer compositions are provided comprising heat transfer fluid and a corrosion inhibiting amount of the corrosion inhibitor of this invention. Any effective, including known, heat transfer fluids can be used. A typical and preferred heat transfer fluid is water.

Any other materials, if desired, can be included in the antifreeze or heat transfer compositions. These materials include, among others, one or mixtures of the following: additional corrosion inhibitors including other carboxylic acids or salts, borates like sodium tetraborate and sodium borate, i.e. borax, silicates like sodium silicate and sodium metasilicate pentahydrate, benzoates like sodium benzoate, nitrates like sodium nitrate, nitrites like sodium nitrite, phosphates, carbonates like sodium carbonate, molybdates, hydrocarbyl thiazoles, hydrocarbyltriazoles, such as tolyltriazole or benzotriazole, and the like; stabilizers such as organosilanes and the like; pH adjusters, such as sodium hydroxide and the like; hard water stabilizers; antifoam agents; or other materials useful in antifreeze or heat transfer fluids.

The particular amount of corrosion inhibitor used is not critical but may be any amount effective at inhibiting corrosion, i.e. a corrosion inhibiting amount. Typically, such as in antifreeze concentrate compositions, the total amount of alkanoic, hydrocarbyl dicarboxylic and carbocyclic alkanoic acid/salt is at least about 1, preferably from about 2 to about 15, and most preferably from about 2 to about 5, weight percent of the composition. The composition can have from about 0 to about 99, preferably from about 30 to about 70, freezing point depressant, and, optionally, up to about 10, preferably from about 0.1 to about 1, weight percent other antifreeze additives. The relative amount of the three carboxylic acid components is not narrowly critical. Typically, the ratio of alkanoic to hydrocarbyl dicarboxylic to carbocyclic alkanoic compounds is about 1-6:0.1-3:0.2-6, preferably about 2-4:0.1-1:0.2-3, and most preferably 3.25:0.15:0.2-2.0, respectively.

The corrosion inhibitor of this invention can be used in any system for which corrosion inhibition is desired, such as wherever metal contacts potentially corrosive fluid, particularly in cooling systems such as for internal combustion engines. Typical uses include, among others: heat transfer systems using heat transfer fluids like antifreeze or other materials; hydraulic fluids; cutting fluids; paints; soluble oils; metal cutting fluids; deicers; greases; water handling or treatment; and the like.

Processes for inhibiting corrosion of metal in contact with heat transfer fluid comprise adding a corrosion inhibiting amount of the corrosion inhibitor combination into the fluid. The particular manner for adding the corrosion inhibitor to the fluid is not critical and can use any suitable, including known, technique for adding corrosion inhibitors to heat transfer fluid.

The corrosion inhibitor combination of this invention has been found to give enhanced corrosion protection in the absence of other corrosion inhibitors, such as triazoles, and as compared to when any one or two of the combination components are used separately or in pairs.

The following examples present illustrative embodiments of this invention without intention to limit its scope. All percentages given in the disclosure and claims are in weight percent, unless otherwise stated.

EXAMPLES

Examples 1-15

Corrosion Inhibitor Compositions

Compositions containing the corrosion inhibitors given in Table 1 are prepared by mixing the corrosion inhibitors with 1 weight percent water, sufficient sodium hydroxide to give a pH of between 8 and 9, and a balance to 100 weight percent of ethylene glycol. The alkanoic compound is 2-ethylhexanoic acid. The hydrocarbyl dicarboxylic acid is sebacic acid. The carbocyclic alkanoic compounds are 4-cyclohexylbutyric acid, called as CHB, used in Examples 4 and 6-10 and a 15:85% mixture of 2- and 3-cyclohexenylpropionic acids, used in Examples 11-14, called CHP. Control examples, designated by "C", without the three carboxylic acid combination, including just ethylene glycol in Example 1C, are included for comparison.

TABLE 1

| | Corrosion Inhibitor Compositions | | | |
|---|---|---|---|---|
| Example | 2-Ethyl hexanoic | Sebacic | Carbocyclic Alkanoic | Tolyl-triazole |
| 1C | — | — | — | — |
| 2C | 3.25 | — | — | — |
| 3C | — | 0.15 | — | — |
| 4C | — | — | 1.0 CHB | — |
| 5C | 3.25 | 0.15 | — | — |
| 6C | 3.25 | — | 1.0 CHB | — |
| 7C | — | 0.15 | 1.0 CHB | — |
| 8 | 3.25 | 0.15 | 1.0 CHB | — |
| 9 | 3.25 | 0.15 | 2.0 CHB | — |
| 10 | 3.25 | 0.15 | 0.2 CHB | — |
| 11 | 3.25 | 0.15 | 0.5 CHP | — |
| 12 | 3.25 | 0.15 | 1.0 CHP | — |
| 13 | 3.25 | 0.15 | 1.5 CHP | — |
| 14 | 3.25 | 0.15 | 2.0 CHP | — |
| 15C | 3.25 | 0.15 | — | 0.2 |

Examples 16 and 17

Corrosion Performance Tests

In Example 16, the corrosion inhibitors of Examples 2–8, 14 and 15 are tested, following the standard ASTM D-1384 glassware test. Each test is conducted three times for each composition with the average of the three results given in Table 2, along with the maximum values established for passing the tests.

TABLE 2

Example 16: ASTM D-1384 Glassware Test Results

| Example | Copper | Brass | 70/30 Solder | Steel | Iron | Aluminum |
|---|---|---|---|---|---|---|
| Maximum | 10 | 10 | 30 | 10 | 10 | 30 |
| 2C | 3 | 3 | −1 | 16 | −1 | 12 |
| 3C | 2 | 2 | 31 | 98 | 523 | 59 |
| 4C | 2 | 2 | −1 | 0 | 4 | 106 |
| 5C | 1 | 0 | −4 | −1 | −3 | 1 |
| 6C | 1 | 3 | −2 | −1 | −4 | 0 |
| 7C | 3 | 1 | −1 | −1 | −2 | 146 |
| 8 | 1 | 1 | −2 | −1 | −3 | 0 |
| 14 | 6 | 7 | 1 | 2 | −1 | 2 |
| 15C | 1 | 1 | −2 | −1 | −4 | 4 |

In Table 2, Weight losses are given in milligrams per coupon, after two weeks testing. Negative values represent weight gains, such as due to oxide formation. Each test uses the composition given in Table 1, diluted to 33 volume percent with ASTM corrosive water having 100 weight ppm each of chloride, sulfate, and bicarbonate.

All of the glassware tests show low weight losses for copper and brass. This shows that all the carboxylic acids provide good protection of copper and brass well within ASTM D-1384 specifications. These tests, however, are not sensitive enough to distinguish the degree of copper and brass corrosion protection given by each composition. For this reason, cyclic polarization tests are also performed, as described in Example 17. The high aluminum weight losses for Examples 2–4 show that combinations of at least two carboxylic acids are necessary to obtain good aluminum protection. The high aluminum weight loss in Example 7 may be due to the relatively low carboxylic acid concentration. Carboxylic acid concentrations of at least two percent are generally needed for good aluminum protection. Steel is protected by all compositions except Examples 2 and 3. Solder and iron are protected by all compositions except Example 3. Comprehensive protection is provided by the compositions of Examples 8 and 14 containing the three carboxylic acid combination of this invention.

In Example 17, further performance testing is conducted using cyclic polarization. This is an electrochemical test in which the potential of the positive metal specimen is measured in an open circuit at a rate of 2 millivolts per second. This tends to corrode the metal giving an accurate measure of the corrosion inhibiting effect for the composition. The ability of the corrosion inhibitors to prevent corrosion is shown by a stable current. Up to a certain potential, the corrosion force induced by the positive potential is insufficient to overcome the inhibiting action of the corrosion inhibitors. Beyond this potential, the corrosion current rapidly increases. The potential at which this change occurs is called the Rupture Potential ($E_R$). Once the $E_R$ is reached, the direction of the potential scan is reversed, at a corrosion current of 200 microamperes per square centimeter ($\mu A/cm^2$), in order to observe the ability of the corrosion inhibitor to inhibit ongoing corrosion. The potential at which the corrosion current returns to the inhibited corrosion level is called the Passivation Potential ($E_P$). Greater corrosion inhibition is shown by more positive rupture and passivation potentials, given in millivolts versus saturated calomel electrode (SCE) reference. The results for the cyclic polarization tests are given in Table 3, and may be compared with the values for Examples 1C when no inhibitors are present.

TABLE 3

Example 17: Electrochemical Cyclic Polarization Tests
$E_R$ and ($E_P$), in millivolts v. SCE

| Ex. | Copper | Brass | 70/30 Solder | Steel | Iron | Aluminum |
|---|---|---|---|---|---|---|
| 1C | −30 | −30 | −375 | −750 | −740 | −470 |
| | (−10) | (−110) | — | (−720) | (−720) | (−630) |
| 2C | 830 | 910 | 1,040 | −130 | −60 | 160 |
| | (640) | (1,050) | — | (−400) | (−320) | (670) |
| 3C | 140 | 230 | −340 | 20 | −550 | −460 |
| | (−20) | (50) | — | (−40) | (−650) | (−610) |
| 4C | 850 | 390 | 60 | 1,100 | 20 | −180 |
| | 10 | (20) | — | (−300) | (−300) | (−600) |
| 5C | 810 | 700 | 990 | 850 | 800 | 1,150 |
| | (590) | (980) | — | (−400) | (−400) | — |
| 6C | 1,030 | 1,060 | 1,170 | 950 | 930 | 1,300 |
| | (1,030) | (860) | — | (1,080) | (−400) | — |
| 7C | 1,040 | 1,160 | 310 | 1,050 | 1,100 | −80 |
| | (0) | (120) | — | (1,100) | (680) | (−650) |
| 8 | 980 | 1,030 | 1,030 | 940 | 820 | 1,170 |
| | (1,120) | (1,140) | — | (1,080) | (1,020) | — |
| 9 | 1,000 | 1,060 | 1,120 | 980 | 1,090 | 1,340 |
| | (1,100) | (1,110) | — | (1,080) | (1,100) | — |
| 10 | 1,040 | 1,040 | 1,070 | 890 | 870 | 1,190 |
| | (1,150) | (1,150) | — | (920) | (−400) | — |
| 11 | 890 | 950 | — | — | 430 | — |
| | (970) | (990) | — | — | (−400) | — |
| 12 | 920 | 950 | — | — | 870 | — |
| | (1,050) | (970) | — | — | (−400) | — |
| 13 | 930 | 980 | — | — | 870 | — |
| | (1,050) | (1,080) | — | — | — | — |
| 14 | 980 | 1,010 | — | 900 | 850 | 1,250 |
| | (1,050) | (1,060) | — | (1,040) | (650) | — |
| 15C | 1,020 | 1,110 | 960 | 750 | 750 | 1,170 |
| | (1,210) | — | — | (990) | (930) | — |

Excellent copper and brass protection is shown by Examples 2, 5, 6, and 8–14. The compositions containing all three carboxylic acids, i.e. Examples 8–10, equal and surpass, as for copper and brass protection, the performance of the composition in Example 15 containing tolyltriazole instead of cyclohexylbutyric acid.

Example 18

Effect of Varying pH

Corrosion protection over a pH range of 8 to 11 using the composition of Example 9 is measured, adjusting the pH by adding sodium hydroxide.

TABLE 4

Example 18: pH Evaluation Using Electrochemical Cyclic Polarization

| pH | Copper | Brass | 70/30 Solder | Steel | Iron | Aluminum |
|---|---|---|---|---|---|---|
| 8.0 | 1,000 | 1,060 | 1,120 | 980 | 1,090 | 1,340 |
|  | (1,100) | (1,110) |  | (1,080) | (1,100) |  |
| 9.5 | 930 | 1,060 | 1,100 | 910 | 920 | 1,380 |
|  | (1,080) | (1,120) |  | (1,080) | (1,000) |  |
| 11.0 | 1,000 | 950 | 880 | 580 | 580 | 1,320 |
|  | (1,120) | (1,140) |  | (1,090) | (1,080) |  |

Good corrosion protection is provided over the entire pH range of 8.0 to 11.0. The protection of all metals is essentially constant over the pH range, with a small decrease in iron and steel protection at pH 11.0.

We claim:

1. A corrosion inhibitor composition comprising a combination of at least one alkanoic acid or salt thereof, at least one hydrocarbyl dicarboxylic acid or salt thereof, and at least one carbocyclic-substituted alkanoic monoacid or salt thereof comprising a structure:

wherein:
M is hydrogen or cation;
m is 0 or 2 such that $H_{9+m}C_6$ is cyclohexenyl or cyclohexyl, respectively; and
R is alkylene having a formula $C_nH_{2n}$ wherein n is at least 3 when m is 2.

2. The composition of claim 1 wherein m is 2 such that the carboxylic monoacid or salt thereof is cyclohexylalkanoic acid or salt thereof having at least 4 alkanoic carbon atoms.

3. The composition of claim 2 wherein the carbocyclic monoacid or salt thereof is a material selected from the group consisting of cyclohexylbutyric acid, cyclohexylisobutyric acid, and salts thereof.

4. The composition of claim 1 wherein m is 0 such that the carbocyclic monoacid or salt thereof is cyclohexenylalkanoic acid or salt thereof.

5. The composition of claim 4 wherein the carbocyclic monoacid or salt thereof is a material selected from the group consisting of cyclohexenylpropionic acid, cyclohexenylisopropionic acid, cyclohexenylbutyric acid, cyclohexenylisobutyric acid, and salts thereof.

6. The composition of claim 1 wherein the alkanoic and hydrocarbyl dicarboxylic acids and salts thereof each have 5 to 16 carbon atoms.

7. The composition of claim 6 wherein the alkanoic group is 2-ethylhexanoic and the hydrocarbyl dicarboxylic group is sebacic.

8. A heat transfer composition comprising heat transfer fluid and a corrosion inhibiting amount of the corrosion inhibitor of claim 1.

9. An antifreeze composition comprising freezing point depressant and a corrosion inhibiting amount of the corrosion inhibitor of claim 1.

10. The antifreeze of claim 9 having from about 1 to about 15 weight percent of the corrosion inhibitor combination.

11. The antifreeze of claim 10 having from about 1 to about 6 weight percent alkanoic acid or salt thereof, from about 0.1 to about 3 weight percent hydrocarbyl dicarboxylic acid or salt thereof and from about 0.2 to about 0.6 weight percent carbocyclic alkanoic acid or salt thereof.

12. The antifreeze of claim 11 wherein m is 2 such that the carbocyclic monoacid or salt thereof is cyclohexylalkanoic acid or salt thereof having at least 4 alkanoic carbon atoms.

13. The antifreeze of claim 1 wherein the carbocyclic monoacid or salt thereof is a material selected from the group consisting of cyclohexylbutyric acid, cyclohexylisobutyric acid, and salts thereof.

14. The antifreeze of claim 11 wherein m is 0 such that the carbocyclic monoacid or salt thereof is cyclohexenylalkanoic acid or salt thereof.

15. The antifreeze of claim 14 wherein the carbocyclic monoacid or salt thereof is a material selected from the group consisting of cyclohexenylpropionic acid, cyclohexenylisopropionic acid, cyclohexenylbutyric acid, cyclohexenylisobutyric acid, and salts thereof.

16. The antifreeze of claim 9 wherein the alkanoic and hydrocarbyl dicarboxylic acids and salts thereof each have 5 to 16 carbon atoms.

17. The antifreeze of claim 16 wherein the alkanoic group is 2-ethylhexanoic and the hydrocarbyl dicarboxylic group is sebacic.

18. A process for inhibiting corrosion of metal which comprises contacting the metal with heat transfer fluid comprising a corrosion inhibitor combination of at least one alkanoic acid or salt thereof, at least one hydrocarbyl dicarboxylic acid or salt thereof, and at least one carbocyclic-substituted alkanoic monoacid or salt thereof comprising a structure:

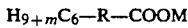

wherein:
M is hydrogen or cation;
m is 0 or 2 such that $H_{9+m}C_6$ is cyclohexenyl or cyclohexyl, respectively; and
R is alkylene having a formula $C_nH_{2n}$ wherein n is at least 3 when m is 2.

19. The process of claim 18 wherein m is 2 such that the carbocyclic monoacid or salt thereof is cyclohexylalkanoic acid or salt thereof having at least 4 alkanoic carbon atoms.

20. The process of claim 19 wherein the carbocyclic monoacid or salt thereof is a material selected from the group consisting of cyclohexylbutyric acid, cyclohexylisobutyric acid, and salts thereof.

21. The process of claim 18 wherein m is 0 such that the carbocyclic monoacid or salt thereof is cyclohexenylalkanoic acid or salt thereof.

22. The process of claim 21 wherein the carbocyclic monoacid or salt thereof is a material selected from the group consisting of cyclohexenylpropionic acid, cyclohexenylisopropionic acid, cyclohexenylbutyric acid, cyclohexenylisobutyric acid, and salts thereof.

23. The process of claim 18 wherein the alkanoic and hydrocarbyl dicarboxylic acids and salts thereof each have 5 to 16 carbon atoms.

24. The process of claim 23 wherein the alkanoic group is 2-ethylhexanoic and the hydrocarbyl dicarboxylic group is sebacic.

25. The process of claim 18 wherein the heat transfer fluid contains freezing point depressant.

26. The process of claim 25 having from about 1 to about 15 weight percent of the corrosion inhibitor combination.

27. The process of claim 26 having from about 1 to about 6 weight percent alkanoic acid or salt thereof, from about 0.1 to about 3 weight percent hydrocarbyl dicarboxylic acid or salt thereof and from about 0.2 to about 0.6 weight percent carbocyclic alkanoic acid or salt thereof.

28. The process of claim 25 wherein m is 0 such that the carbocyclic monoacid or salt thereof is cyclohexenylalkanoic acid or salt thereof.

29. The process of claim 28 wherein the carbocyclic monoacid or salt thereof is a material selected from the group consisting of cyclohexenylpropionic acid, cyclohexenylisopropionic acid, cyclohexenylbutyric acid, cyclohexenylisobutyric acid, and salts thereof.

30. The process of claim 25 wherein the alkanoic and hydrocarbyl dicarboxylic acids and salts thereof each have 5 to 16 carbon atoms.

31. The process of claim 30 wherein the alkanoic group is 2-ethylhexanoic and the hydrocarbyl dicarboxylic group is sebacic.

32. The process of claim 18 wherein m is 2 such that the carbocyclic monoacid or salt thereof is cyclohexylalkanoic acid or salt thereof having at least 4 alkanoic carbon atoms.

33. The process of claim 32 wherein the carbocyclic monoacid or salt thereof is a material selected from the group consisting of cyclohexylbutyric acid, cyclohexylisobutyric acid, and salts thereof.

* * * * *